(12) United States Patent
Zhang

(10) Patent No.: US 6,798,262 B2
(45) Date of Patent: Sep. 28, 2004

(54) SWITCHING REGULATOR CONTROL CIRCUIT FOR A PFM CONTROL

(75) Inventor: Wei Zhang, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/410,226

(22) Filed: Apr. 9, 2003

(65) Prior Publication Data
US 2003/0193321 A1 Oct. 16, 2003

(30) Foreign Application Priority Data
Apr. 16, 2002 (JP) ........................................ 2002-113652

(51) Int. Cl.[7] ................................................ H03K 7/08
(52) U.S. Cl. ...................................... 327/175; 327/176
(58) Field of Search ............................... 327/175, 176, 327/100, 113, 114, 156, 158, 161

(56) References Cited

U.S. PATENT DOCUMENTS 6,154,015 A * 11/2000 Ichiba ........................ 323/225

* cited by examiner

Primary Examiner—Shawn Riley
(74) Attorney, Agent, or Firm—Adams & Wilks

(57) ABSTRACT

A switching regulator control circuit for PFM control of a DC-DC converter includes a reference voltage producing circuit, a voltage dividing circuit for dividing an output voltage of the DC-DC converter, a comparator for comparing the reference voltage and the divided voltage and outputting a comparison signal, a ring oscillator for outputting a signal for controlling the output transistor, which controls the output voltage of the DC-DC converter, and a logic OR circuit having a first input connected to an output of the ring oscillator and a second input connected to the comparison signal and an output connected to an input of the ring oscillator. Even when the output of the comparator varies frequently, such as when an output voltage closely approaches a set voltage, the ON period of the output transistor remains stable.

10 Claims, 3 Drawing Sheets

SWITCHING REGULATOR CONTROL CIRCUIT FOR A PFM CONTROL

BACKGROUND OF THE INVENTION

1. Field of the Invention

The present invention relates to a switching regulator control circuit for a PFM control circuit having a stable duty cycle and noise immunity when an output voltage closely approaches a set voltage.

The basic operation of a switching regulator control circuit is as follows. An output voltage is fed back and compared with a reference voltage by an output voltage control comparator. When the output voltage becomes smaller than a set voltage, the comparator is operated to send an oscillation start signal to an oscillating circuit. Then, the oscillating circuit outputs a switching pulse, so that an output transistor is turned ON or OFF to thereby adjust the output voltage.

FIGS. 5A and 5B show an example of a step-up DC-DC converter to which a PFM control switching regulator is applied.

In the PFM control switching regulator, an ON period of an output transistor is always constant. Thus, an OFF period is adjusted so that an output voltage is stably kept to a constant value.

FIG. 2 shows a conventional switching regulator control circuit for a PFM control. As shown in FIG. 2, the output of a reference voltage circuit 11 and that of voltage dividing circuits 12 and 14 are connected with the input of an output voltage control comparator 14. The output of the output voltage control comparator 14 is connected with the input of a ring oscillator circuit 15. The ring oscillator circuit 15 outputs a signal for controlling a transistor that controls an output voltage of a DC-DC converter.

For a PFM switching regulator 10, the switching regulator control circuits for PFM control as shown in FIG. 2 are widely used. A switching pulse output by the ring oscillator circuit 15 is output by controlling an output signal of the above output voltage control comparator 14.

In FIG. 2, when the output signal, Vosc_EN, of the comparator 14 is "H", an oscillating circuit of the ring oscillator circuit 15 is being operated, so that a switching pulse is outputted to EXT. On the other hand when Vosc_EN is "L", the ring oscillator circuit 15 is stopped, so that EXT becomes "L".

When the Vosc_EN signal is changed from "L" to "H", EXT immediately becomes from "L" to "H". Hereinafter, oscillation is continued. When the Vosc_EN signal is changed from "H" to "L", EXT immediately becomes "L".

However, when the output voltage closely approaches a set voltage, chattering of the Vosc_EN output signal of the above comparator 14 is frequently caused due to the influence of noise. Thus, there may arise such an abnormal duty problem that an ON period shorter than a general switching ON period is successively generated in accordance with the chattering.

When an abnormal duty is caused, an OFF period becomes shorter as an output ON period shortens. Thus, a consumption current of the switching regulator control circuit is increased, so that efficiency in the case of a light load is greatly influenced thereby.

In order to solve the above-mentioned problem, there is also given a method for providing hysteresis in a subsequent stage of the output voltage control comparator 14 to suppress chattering of the output signal of the comparator 14. However, in such a method, a new problem is caused for the reason such as reduction in yield due to variation in manufacturing an integrated circuit. Therefore, a more simplified and effective solving method is required.

SUMMARY OF THE INVENTION

An object of the present invention is therefore to provide a switching regulator control circuit for providing a PFM control with a stable duty cycle and noise immunity, having a circuit structure which is simplified and effective and in which the difficulty in manufacturing an integrated circuit is eliminated as compared with a conventional hysteresis circuit system, using a simple logic structure which is devised in order to solve the above-mentioned conventional problems.

According to the present invention, a simple logic structure is used, a feedback signal for turning ON an output transistor is fed back, and then a logic signal between the feedback signal and an output signal of an output voltage control comparator is input to a ring oscillator circuit. Thus, even in the case of a frequent variation in the output signal of the comparator, which is liable to occur at a time when an output voltage closely approaches a set voltage, a determined ON period for the output transistor is ensured in the ring oscillator circuit, thereby solving the foregoing problems.

DETAILED DESCRIPTION OF THE PREFERRED EMBODIMENTS

Figure 5A:
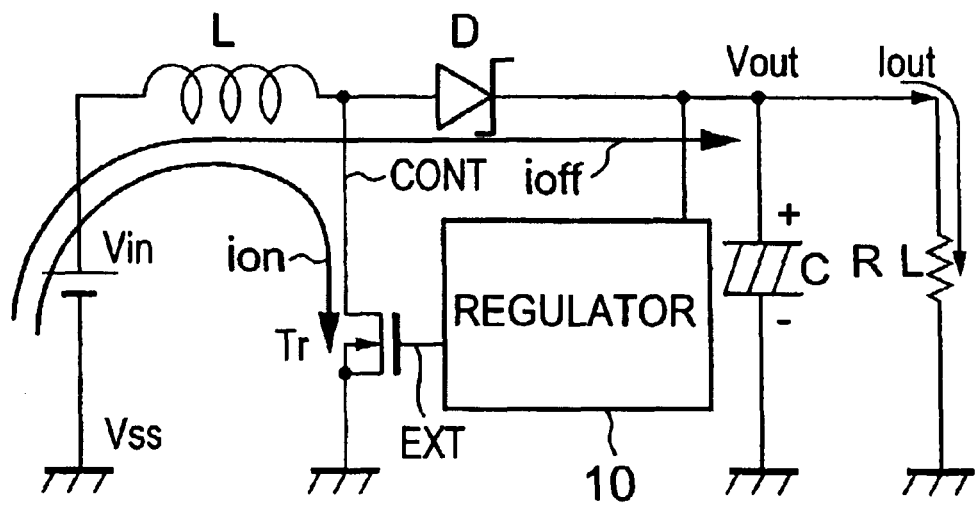
FIG. 5A is a block diagram showing an example of a step-up DC-DC converter to which the switching regulator control circuit for a PFM control is applied and FIG. 5B is an operating wave diagram of the step-up DC-DC converter.
Figure 5B:
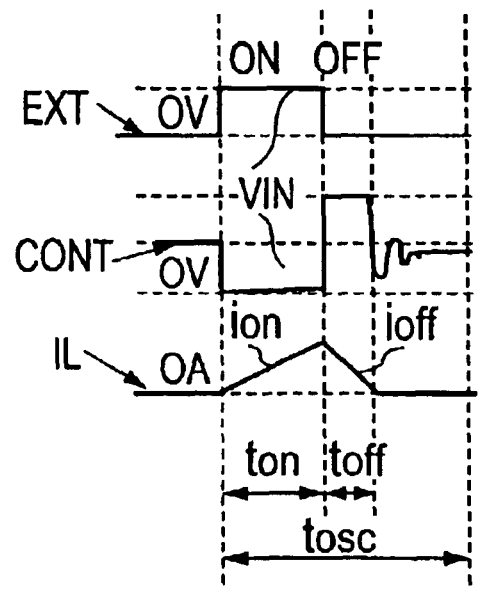

In FIGS. 5A and 5B, although it is similar to a conventional case, as an example to which a switching regulator control circuit for a PFM control of the present invention is applied, a block diagram of a step-up DC-DC converter and its operating characteristic are shown, respectively. In FIG. 5A, in order to obtain an output voltage Vout higher than an input voltage Vin, it is constructed that a power source of Vin and a coil L are added in series.

Specific operation of the circuit will be described. First, a transistor Tr is turned ON by a PFM control switching regulator 10 to make a charging current $i_{on}$ flow, so that energy is stored in the coil L. Next, when the transistor Tr is turned OFF by the PFM control switching regulator 10, an electromotive force is generated in the coil L by the stored energy. When the voltage is equal to or larger than Vin, a discharging current $i_{off}$ flows into an output to raise the voltage Vout. In addition, the energy stored during an ON period of Tr is adjusted by the PFM control switching regulator 10 to stabilize Vout. Note that the PPM control switching regulator 10 to which the switching regulator control circuit for providing PPM control according to the present invention is applied can be applied not only to the step-up DC-DC converter but also to a step-down DC-DC converter, an inversion DC-DC converter, and the like.

Figure 1:
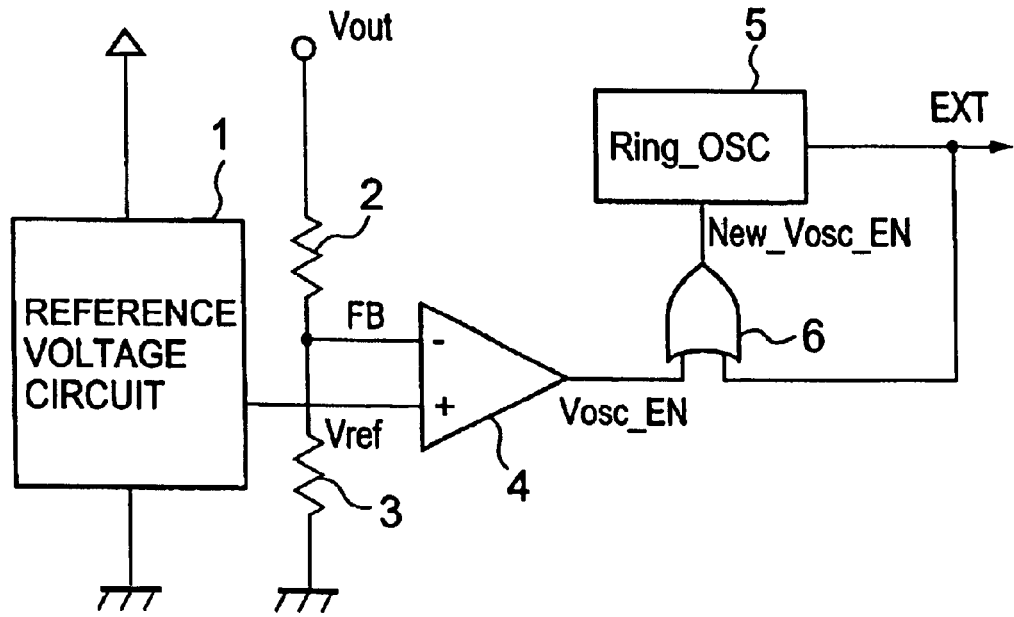
FIG. 1 is a block diagram showing Embodiment 1 of the present invention.
Figure 2:
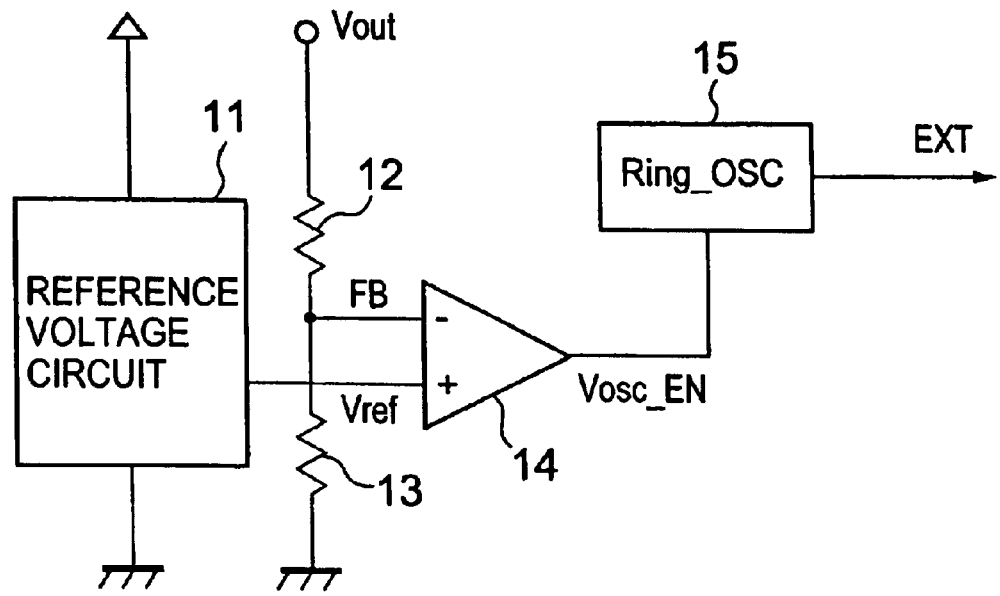
FIG. 2 is a block diagram showing a conventional switching regulator control circuit for providing PFM control.

FIG. 1 shows a basic logic structure of the switching regulator control circuit for providing PFM control according to a first embodiment of the present invention. The output of a reference voltage circuit 1 and that of voltage dividing circuits 2 and 3 are connected with the input of an output voltage control comparator 4. A ring oscillator circuit 5 outputs a signal for controlling a transistor which controls an output voltage of a DC-DC converter. The output of the ring oscillator circuit 5 and that of the output voltage control comparator 4 are input to a logic OR circuit 6. The output of the logic OR circuit 6 is connected with the input of the ring oscillator circuit 5.

When various logic circuits are combined based on such a basic logic structure, a duty guarantee oscillator circuit devised according to the present invention can be realized. Here, an embodiment of the present invention will be described with reference to the drawings.

As shown in FIG. 1, an EXT signal for turning ON an output transistor is fed back, the fed back signal and a Vosc_EN signal as an output signal of the output voltage control comparator 4 are ORed by the OR circuit 6, and a resultant signal New_Vosc_EN is returned as an oscillation start control signal to the ring oscillator circuit 5.

When the output transistor is being turned ON, EXT is "H". During a period for which EXT is "H", a change in Vosc_EN signal is neglected.

When the output transistor is being turned OFF, EXT is "L". Thus, New_Vosc_EN=Vosc_EN. At this time, if the Vosc_EN signal is "H", the oscillation is started and a switching pulse is outputted. An ON period of the pulse is determined to be a time constant of the ring oscillator oscillating circuit 5. If the Vosc_EN signal is "L", the oscillation is stopped and the output transistor is continuously turned OFF. In other words, the Vosc_EN signal for controlling the output of the ring oscillator oscillating circuit 5 is neglected during a period for which the output transistor is being turned ON.

Figure 3:
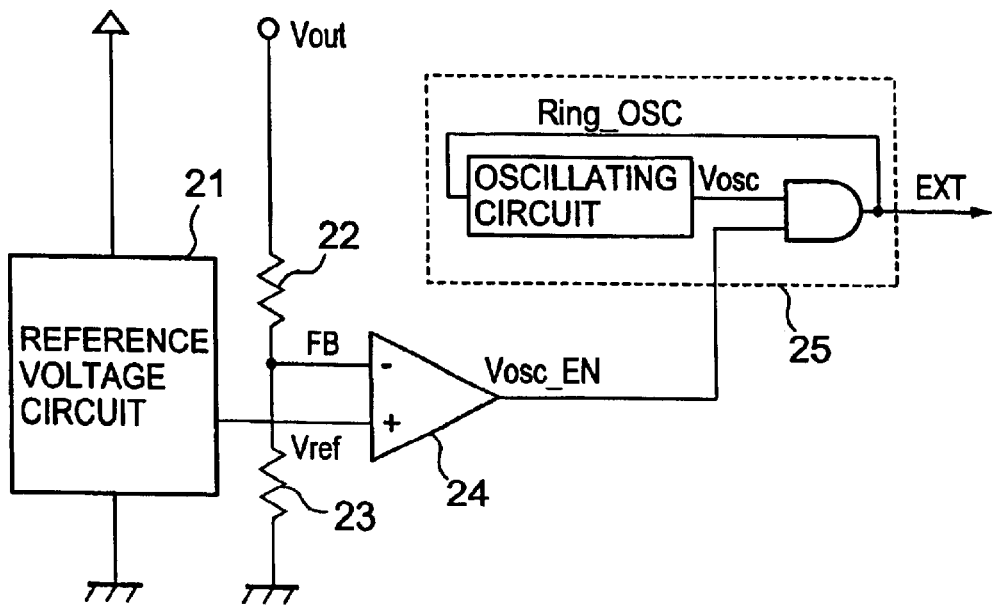
FIG. 3 is a block diagram showing an example of a conventional switching regulator control circuit for providing PFM control.

FIG. 3 shows an example of a conventional switching regulator control circuit for a PFM control widely used.

In FIG. 3, the output of a reference voltage circuit 21 and that of voltage dividing circuits 22 and 23 are connected with the input of an output voltage control comparator 24. The output of the output voltage control comparator 24 is connected with the input of a ring oscillator circuit 25. The ring oscillator circuit 25 outputs a signal for controlling the transistor which controls an output voltage of the DC-DC converter. A rectangular wave pulse Vosc signal outputted from an oscillating circuit and the oscillation start signal Vosc_EN outputted from the output voltage control comparator 24 are ANDed by an AND circuit. A resultant signal is divided into two routes. With respect to one route, the signal is returned to the oscillating circuit, thereby composing the ring oscillator circuit. With respect to the other route, the signal is outputted as the EXT signal for controlling the output transistor. A logic equation is as follows.

$$EXT = Vosc * Vosc\_EN \quad \text{(equation 1)}.$$

When the Vosc_EN signal is "H", EXT=Vosc. Thus, the oscillating circuit starts to oscillate, so that a switching pulse is outputted. An ON period of the pulse is determined to be a time constant of the oscillating circuit.

On the other hand, when the Vosc_EN signal is "L", EXT=L. Thus, the oscillating circuit stops to oscillate. In such a circuit, when chattering of the output signal Vosc_EN of the above-mentioned comparator 24 is caused, there is such an inconvenience that a narrow pulse with an ON period shorter than the ON period determined by the oscillating circuit is successively generated as the switching pulse outputted to EXT.

Figure 4:
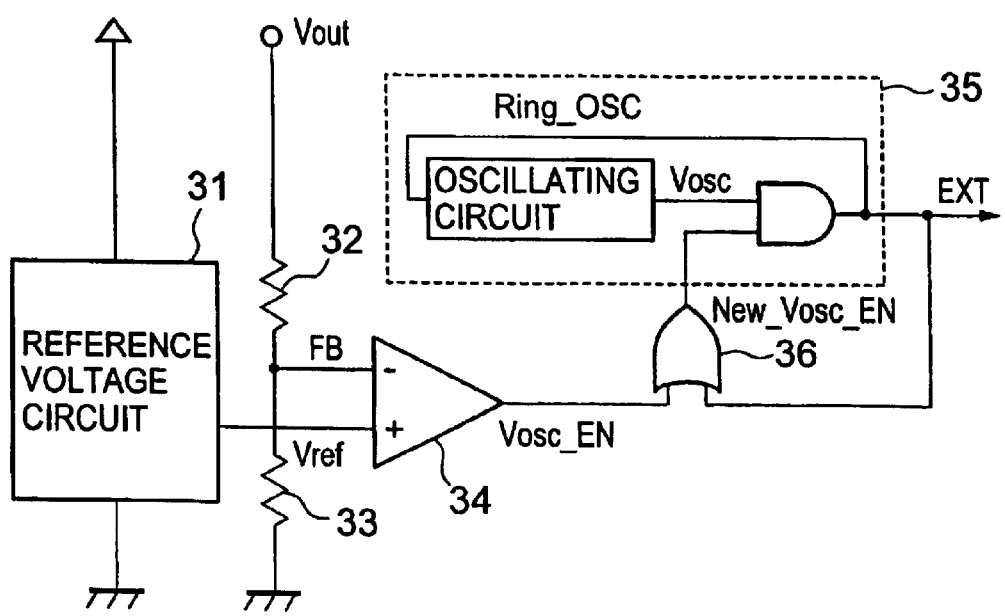
FIG. 4 is a block diagram showing Embodiment 2 of the present invention.

FIG. 4 shows Embodiment 2 of the present invention. The output of a reference voltage circuit 31 and that of voltage dividing circuits 32 and 33 are connected with the input of an output voltage control comparator 34. A ring oscillator circuit 35 outputs a signal for controlling the transistor which controls an output voltage of the DC-DC converter. The output of the ring oscillator circuit 35 and that of the output voltage control comparator 34 are inputted to a logic OR circuit 36. The output of the logic OR circuit 36 is connected with the input of the ring oscillator oscillating circuit 35.

An EXT signal for turning ON the output transistor is fed back, the fed back signal and the output signal Vosc_EN of the output voltage control comparator are ORed by an OR circuit 36. A resultant signal New_vosc_EN is used as an oscillation start signal, and the resultant signal is divided into two routes. With respect to one route, the signal is returned to the oscillating circuit, thereby composing the ring oscillator circuit 35. With respect to the other route, the signal is outputted as the EXT signal for controlling the output transistor. A logic equation is as follows.

$$EXT_{NEXT} = Vosc * \text{New\_Vosc\_EN} \quad \text{(equation 2)}$$
$$= Vosc(\text{Vosc\_EN} + EXT)$$

Symbol $EXT_{NEXT}$ in the equation 2 shows a next state of EXT. In other words, EXT shows a current state of an EXT terminal and $EXT_{NEXT}$ shows a next state of the EXT terminal. The current state EXT of the EXT terminal is fed back, so that the next state $EXT_{NEXT}$ of the EXT terminal is influenced thereby. When the output transistor is being turned ON, EXT is "H", and therefore $EXT_{NEXT}$=Vosc. In other words, during a period for which EXT is "H", a change in Vosc_EN signal is neglected.

On the other hand, when the output transistor is being turned OFF, EXT is "L". Thus, $EXT_{NEXT}$=Vosc*Vosc_EN (this is equivalent to the equation 1). At this time, if the Vosc_EN signal is "H", $EXT_{NEXT}$=Vosc, so that the oscillation is started and a switching pulse is outputted. An ON period of the pulse is determined to be a time constant of the oscillating circuit. If the Vosc_EN signal is "L", $EXT_{NEXT}$=L, so that the oscillation is stopped and the output transistor is continuously turned OFF. In other words, it is realized that the Vosc_EN signal for controlling the output of the oscillating circuit is neglected during a period for which the output transistor is being turned ON.

When the oscillation stop state is transferred to the oscillation start state, EXT is "L" and the Vosc_EN signal is "H". According to the equation 2, $EXT_{NEXT}$=Vosc. Thus, when the duty guarantee circuit devised according to the present invention is added, the initialization of an original oscillating circuit is not affected accordingly.

As described above, according to the present invention, a logically simplified and effective circuit is used, and a determined ON period for the output transistor is ensured in the oscillating circuit even in the case of a frequent variation in output signal of the output voltage control comparator, which is liable to occur at a time when an output voltage extremely approaches a set voltage, in a light load with respect to the PFM control switching regulator. Thus, a switching regulator in which a stable duty is ensured and which has noise immunity can be realized. The difficulty in manufacturing an integrated circuit is eliminated by a conventional hysteresis circuit system, so that circuit operation is ensured. In addition, a circuit scale is small, with the result that the present invention is effective in cost. As described above, the present circuit system is most suitable for the switching regulator control circuit for a PFM control.

What is claimed is:

1. A switching regulator control circuit for PFM control of a DC-DC converter, comprising: a reference voltage generating circuit for generating a reference voltage; a voltage dividing circuit for dividing an output voltage of the DC-DC converter and producing a divided voltage; an output voltage control comparator for comparing the reference voltage and the divided voltage and outputting a comparison signal; a ring oscillator for outputting a signal for controlling a transistor which controls the output voltage of the DC-DC converter; and a logic OR circuit having one input connected to an output of the ring oscillator and another input connected to receive the comparison signal and having an output connected to an input of the ring oscillator.

2. A switching regulator control circuit according to claim 1, wherein the ring oscillator comprises an oscillating circuit and a logic AND circuit, an input of the oscillating circuit is connected to an output of the logic AND circuit, an input of the AND circuit is connected to an output of the oscillating circuit and the output of the logic OR circuit, and the output of the AND circuit serves as the output of the ring oscillator.

3. A DC-DC converter comprising: an input power source; a coil connected to the input power source; a transistor connected to the coil; an output terminal for outputting a regulated voltage; and a switching regulator control circuit according to claim 1 for controlling the transistor to transfer energy from the coil to the output terminal.

4. A DC-DC converter according to claim 3; further comprising an output capacitor connected to the output terminal.

5. A switching regulator control circuit for PFM control of a DC-DC converter, comprising: a comparator for comparing an output voltage of the DC-DC converter to a reference voltage and outputting a comparison signal; an oscillator circuit for outputting a signal for controlling a switching device of the DC-DC converter; and an OR gate having one input connected to an output of the oscillator circuit and another input connected to receive the comparison signal and having an output connected to an input of the oscillator circuit.

6. A switching regulator control circuit according to claim 5; wherein the oscillator circuit is a ring oscillator.

7. A switching regulator control circuit according to claim 5; further comprising an AND gate having an output connected to the input of the oscillator circuit and an input connected to the output of the oscillator circuit and the output of the OR gate.

8. A DC-DC converter comprising: an input power source; a coil connected to the input power source; a transistor connected to the coil; and a switching regulator control circuit for controlling the transistor to transfer energy from the coil to an output terminal, the switching regulator control circuit comprising a comparator for comparing an output voltage of the DC-DC converter with a reference voltage and outputting a comparison signal, an oscillator circuit for outputting a signal for controlling the transistor, and an OR gate having one input connected to an output of the oscillator circuit and another input connected to receive the comparison signal and having an output connected to an input of the oscillator circuit.

9. A DC-DC converter according to claim 8; wherein the oscillator circuit is a ring oscillator.

10. A DC-DC converter according to claim 8; further comprising an AND gate having an output connected to the input of the oscillator circuit, one input connected to the output of the oscillator circuit and another input connected to the output of the OR gate.

* * * * *